United States Patent [19]

Burgert

[11] 4,448,539

[45] May 15, 1984

[54] APPARATUS FOR MIXING SOLID AND LIQUID SUBSTANCES

[76] Inventor: Herwig Burgert, Bismarckstrasse 40, 6300 Giessen, Fed. Rep. of Germany

[21] Appl. No.: 396,041

[22] Filed: Jul. 7, 1982

Related U.S. Application Data

[63] Continuation of Ser. No. 160,984, Jun. 19, 1980, abandoned.

[30] Foreign Application Priority Data

Jun. 22, 1979 [DE] Fed. Rep. of Germany ....... 2925191

[51] Int. Cl.$^3$ ............................ B01F 3/12; B01F 5/10; B01F 15/02
[52] U.S. Cl. ..................................... 366/132; 366/134; 366/137; 366/336; 366/341; 422/132
[58] Field of Search ............... 366/132, 134, 136, 137, 366/336, 337, 341; 422/132

[56] References Cited

U.S. PATENT DOCUMENTS

| | | | |
|---|---|---|---|
| 2,635,859 | 4/1953 | Dreyfus | 366/137 |
| 3,166,020 | 1/1965 | Cook | 366/137 X |
| 3,608,869 | 9/1971 | Woodle | 366/132 |
| 3,807,700 | 4/1974 | Kennedy | 366/137 |
| 4,037,825 | 7/1977 | Burgert | 366/336 |
| 4,170,420 | 10/1979 | Underwood | 366/137 |

FOREIGN PATENT DOCUMENTS 130831 1/1911 Canada .

Primary Examiner—Philip R. Coe
Attorney, Agent, or Firm—Wells & Wells

[57] ABSTRACT

The method of mixing solid and liquid substances comprises the steps of keeping the substances in a constant circulation through a mixing tank by pumping the substances through a tank outlet and feeding them back through a tank inlet, discharging ready mixture from the tank, and supplying simultaneously a quantity of substances to the tank that equals the quantity of the ready mixture discharged from the tank. The apparatus for performing the method comprises a loop-type reactor with a reactor housing having inlet means at one end and outlet means at the opposite end, and having a tube socket for introducing the substances into the reactor. A control valve regulates the quantity of substances admitted to the reactor. The inlet means and the outlet means are interconnected by a pipe line, including a circulating pump. The pump keeps the substances in a constant flow through the reactor and the pipe line. A discharge valve is connected to the pipe line for discharging part of the ready mixture. A suitable connection between the discharge valve and the control valve causes the latter to feed such a quantity of substances to the reactor that equals the quantity of the ready mixture withdrawn through the discharge valve.

2 Claims, 1 Drawing Figure

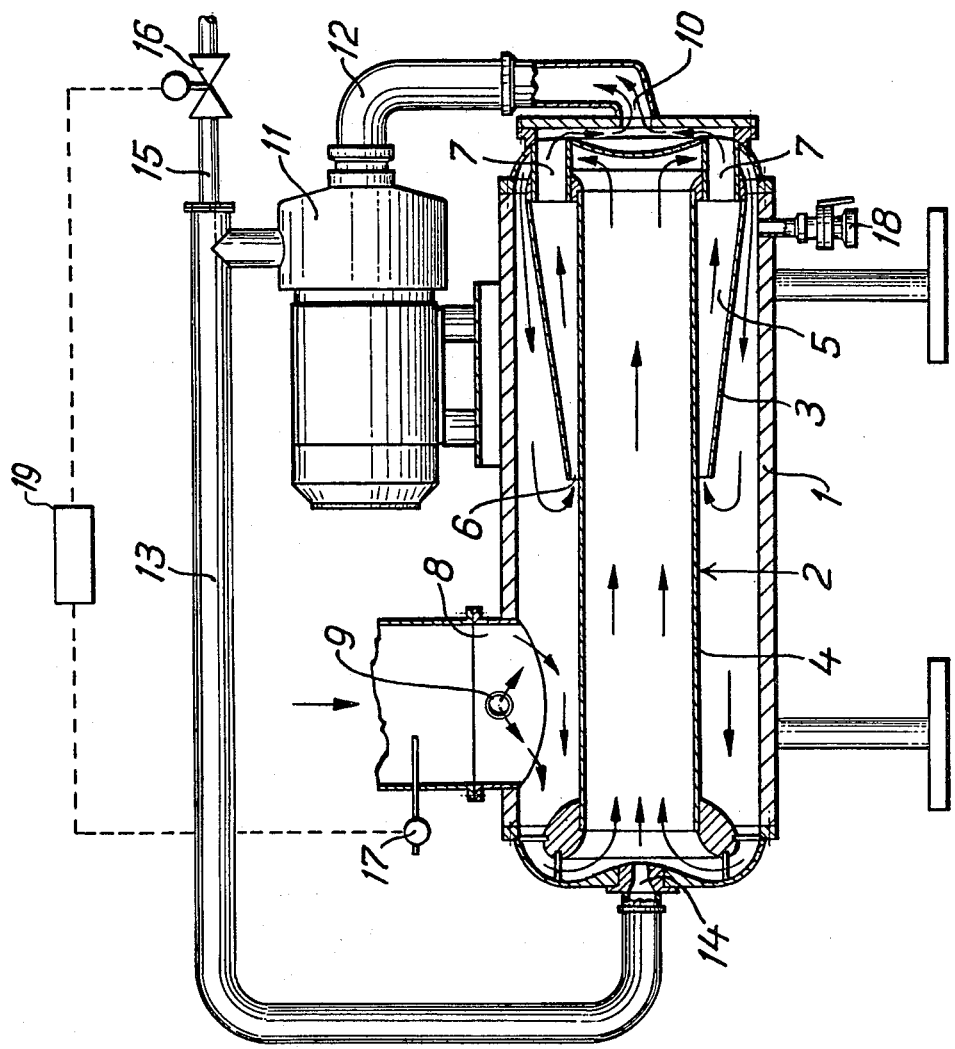

APPARATUS FOR MIXING SOLID AND LIQUID SUBSTANCES

This is a continuation of application Ser. No. 160,984, filed June 19, 1980, and now abandoned.

BACKGROUND OF THE INVENTION

The invention relates to the procedure of mixing solid and liquid substances.

Mixing solid and liquid substances is mostly accomplished in a stirring apparatus which usually comprises a tank wherein a stirrer rotates. Solid substances and liquids are, for example, mixed when a sugar solution is prepared.

However, it is a disadvantage of such a simple stirring apparatus that the centrifugal forces tend to drive the solid particles to the wall of the tank where they settle in a compact mass. This makes the mixing procedure slow and not sufficiently efficient. Moreover, after mixing the tank has to be emptied and refilled completely. The production of such a solution is therefore discontinuous which entails a severe loss of time.

It is, therefore the object of the invention to provide a method of mixing solid substances with liquids in such a way that the ready mixture is obtained in a continuous flow.

SUMMARY OF THE INVENTION

The above stated object is attained by a method comprising the steps of keeping the substances in a constant circulation inside a mixing tank, pumping the mixture through a pipe connection from the tank outlet back to the tank inlet, discharging ready mixture from the tank, and supplying a quantity of fresh substances to the tank that equals the quantity of the ready mixture that has been withdrawn from the tank.

A reactor which after slight modifications, is basically suited for performing the invented method is, for example discribed in the U.S. Pat. No. 4,037,825 the disclosure of which is incorporated herein.

Such a reactor comprises a tube-shaped reactor housing supported horizontally on a foundation. The housing has inlet means at one end and outlet means at the opposite end. A guide tube in the reactor housing defines a mixing chamber between the guide tube and the inner wall of the reactor housing. A further short tube surrounds the guide tube and is connected to the guide tube at one end adjacent to the reactor outlet means. A filling socket is connected to the upper side of the reactor housing for filling the substances into the reactor. A pipe line interconnects the reactor housing outlet means and inlet means. A circulating pump is part of the pipe connection for pumping the mixture from the outlet means back to the inlet means. A discharge valve is part of the pipe connection for withdrawing part of the ready mixture from the reactor, and a control valve is part of the filling socket. The discharge valve and the control valve are so interconnected that always the same quantity of substances is fed to the reactor that is withdrawn by way of the discharge valve.

BRIEF DESCRIPTION OF THE DRAWING

The invention will be more readily comprehended from the following description when taken in conjunction with the appending drawing showing schematically a loop-type reactor for performing the invented method.

DESCRIPTION OF THE PREFERRED EMBODIMENT

Referring now to the drawing, the reactor is shown to comprise a cylindrical reactor housing 1 wherein a guide tube 2 is concentrically arranged. Through part of its length the guide tube is provided with a double wall having an inner wall 4 and an outer wall 3. Both walls define between them an annular hollow space 5 with an inlet 6 at one end of the outer wall 3. The other end of the outer wall 3 is connected to the inner wall 4. Through this connection tubes 7 extend to the reactor outlet 10.

On the upper side of the reactor housing 1 there is provided a filling socket 8. A pipe 9 ends in this filling socket. Through the filling socket the solid substances are introduced into the reactor while the liquid substances enter through the pipe 9. A level control indicator 17 is part of the socket 8. By means of this control valve the quantity of substances filled into the reactor is regulated.

On the left-hand side of the drawing there is an inlet opening in the reactor 1, including an injection nozzle 14. A pipe connection 12;13 interconnects the outlet 10 of the reactor with the inlet. In this pipe connection there is arranged a pump 11 which causes the mixture to circulate constantly through the reactor and the pipes 12;13.

A discharge valve 16 is connected to the pipe 13 for emptying the ready mixture into appropriate tanks or pipes (not shown).

A suitable connection 19 exists between the discharge valve 16 and the level control indicator 17.

When the reactor is filled and in operation the circulating pump drives the substances through the reactor and from there through the pipe line 12;13 back into the reactor by way of the nozzle 14. This causes the substances to be thoroughly mixed.

Upon opening of the discharge valve 16, the ready mixture flows into a discharge pipe. Through the connection 19 the control valve is so regulated that, at the same time, new substances are admitted to the reactor to an extent that they will replace the discharged quantity of the mixture.

A faucet 18 is provided at the lower side of the reactor housing for completely emptying the reactor, if desired.

What is claimed is:

1. A loop reactor for mixing solid and liquid substances, the reactor comprising
   a. a tube-shaped reactor housing (1) supported horizontally on a foundation;
   b. inlet means (14) at one end and outlet means (10) at the opposite end of said reactor housing;
   c. a guide tube (2) in said reactor housing defining a mixing chamber between said guide tube and the inner wall of said reactor housing;
   d. a tube portion (3) surrounding said guide tube and being connected to said guide tube at the end adjacent said outlet means, said tube portion and said guide tube defining an annular space (5) between them, said annular space being connected to said mixing chamber by openings (6) through which said substances enter into said annular space;
   e. a filling socket (8) having means for filling both said solid and liquid substances connected to the upper side of said reactor housing adjacent said inlet means for filling the substances into the reactor housing;

f. at least one level control indicator (17) in said filling socket for opening and closing said socket and thereby regulating the level of the substances in the reactor;

g. a pipe connection (12) and (13) between the reactor housing inlet means and outlet means;

h. a circulating pump (11) in said pipe connection for pumping the mixture from said outlet means to said inlet means; and i. a discharge valve (16) connected to said pipe connection for discharging the ready mixture.

2. A loop reactor as claimed in claim 1, and further comprising means connecting said discharge valve and said control valve so that upon opening of said discharge valve for discharging the ready mixture the control vavle is simultaneously operated to feed a corresponding quantity of substances into the reactor.

* * * * *